(12) United States Patent
Tanaka

(10) Patent No.: US 11,349,507 B2
(45) Date of Patent: May 31, 2022

(54) RADIO FREQUENCY MODULE AND COMMUNICATION DEVICE

(71) Applicant: MURATA MANUFACTURING CO., LTD., Nagaokakyo (JP)

(72) Inventor: Rui Tanaka, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 17/093,647

(22) Filed: Nov. 10, 2020

(65) Prior Publication Data

US 2021/0152192 A1 May 20, 2021

(30) Foreign Application Priority Data

Nov. 18, 2019 (JP) .............................. JP2019-208038

(51) Int. Cl.
*H04B 1/00* (2006.01)
*H04B 1/04* (2006.01)

(52) U.S. Cl.
CPC ........... *H04B 1/006* (2013.01); *H04B 1/0067* (2013.01); *H04B 1/04* (2013.01); *H04B 2001/0408* (2013.01)

(58) Field of Classification Search
CPC .... H04B 1/005; H04B 1/0053; H04B 1/0057; H04B 1/006; H04B 1/0067; H04B 1/0075; H04B 1/0078; H04B 1/03; H04B 1/04; H04B 1/0458; H04B 1/0457; H04B 1/0483; H04B 1/1018; H04B 1/1036; H04B 1/44; H04B 1/48; H04B 7/0602; H04B 2001/0408; H04B 2001/0416

USPC ....... 375/219, 220, 222, 259, 260, 262, 265, 375/267, 297, 318; 343/876; 370/277, 370/278, 282; 455/78, 80, 82–84, 88, 455/114.3
See application file for complete search history.

(56) References Cited

U.S. PATENT DOCUMENTS

| 8,036,148 | B2* | 10/2011 | Fukamachi | .............. H04B 1/44 370/282 |
| 9,780,735 | B1* | 10/2017 | Obiya | ..................... H03F 3/195 |
| 2005/0151599 | A1* | 7/2005 | Ido | .......................... H03H 9/72 333/133 |
| 2007/0080757 | A1 | 4/2007 | Yahata et al. | |

(Continued)

FOREIGN PATENT DOCUMENTS

| WO | 2015/098792 A1 | 7/2015 |
| WO | 2018/168500 A1 | 9/2018 |
| WO | 2019/181589 A1 | 9/2019 |

OTHER PUBLICATIONS

Chinese Office Action dated Dec. 9, 2021 in Chinese Application No. 202011268973.5.

(Continued)

*Primary Examiner* — Young T. Tse
(74) *Attorney, Agent, or Firm* — Xsensus LLP

(57) ABSTRACT

A radio frequency module includes: a module board including a first principal surface; a reception filter disposed on or above the first principal surface; a transmission filter disposed on the reception filter; a switch mounted on the module board; and a bonding wire that connects the transmission filter to the switch. One end of the bonding wire is connected to the transmission filter and the other end of the bonding wire is connected to the switch.

20 Claims, 9 Drawing Sheets

(56) References Cited

U.S. PATENT DOCUMENTS

| | | | |
|---|---|---|---|
| 2011/0304388 A1* | 12/2011 | Yamawaki | H04B 1/006 |
| | | | 327/557 |
| 2018/0131501 A1* | 5/2018 | Little | H04B 1/0064 |
| 2018/0226367 A1* | 8/2018 | Babcock | H03F 1/347 |
| 2018/0226928 A1* | 8/2018 | Obiya | H04B 1/18 |
| 2018/0316311 A1* | 11/2018 | Gebeyehu | H03F 1/0227 |
| 2019/0267339 A1* | 8/2019 | Murase | H04B 1/40 |

OTHER PUBLICATIONS

Korean Office Action dated Dec. 7, 2021 in Korean Application No. 10-2020-0149174.

\* cited by examiner

RADIO FREQUENCY MODULE AND COMMUNICATION DEVICE

CROSS REFERENCE TO RELATED APPLICATION

The present application is based on and claims priority of Japanese Patent Application No. 2019-208038 filed on Nov. 18, 2019. The entire disclosure of the above-identified application, including the specification, drawings and claims is incorporated herein by reference in its entirety.

TECHNICAL FIELD

The present disclosure relates to a radio frequency module and a communication device.

BACKGROUND

In mobile communication apparatuses such as mobile phones, the arrangement of circuit elements included in radio frequency front-end circuits is becoming complex, particularly with developments in multiband technologies.

International Publication No. WO 2015/098792 discloses an acoustic wave filter device including a transmission filter chip and a reception filter chip which are stacked one on the top of the other. In order to achieve excellent isolation characteristics, a space between an IDT electrode of the transmission filter chip and an IDT electrode of the reception filter chip is ensured.

SUMMARY

Technical Problems

However, as recognized by the present inventor, the filter device described in International Publication No. WO 2015/098792 has a risk of lacking isolation between the transmission filter and the reception filter due to further miniaturization of filter devices.

In view of the above, and other issues with conventional circuit structures, the present disclosure provides a radio frequency module and a communication device capable of enhancing the isolation characteristics of a reception filter and a transmission filter that are stacked one on top of the other.

Solutions

A radio frequency module according to one aspect of the present disclosure includes: a module board including a first principal surface; a first filter disposed on or above the first principal surface; a second filter disposed on the first filter; a circuit component mounted on the module board; and a bonding wire that connects the second filter to the circuit component. One of the first filter and the second filter is a transmission filter, and the other of the first filter and the second filter is a reception filter. One end of the bonding wire is connected to the second filter, and the other end of the bonding wire is connected to the circuit component or an electrode on the first principal surface, the electrode being connected to the circuit component.

Advantageous Effects

The present disclosure can provide a radio frequency module and a communication device that enhance the isolation characteristics of a reception filter and a transmission filter that are stacked one on top of the other.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

Figure 1:
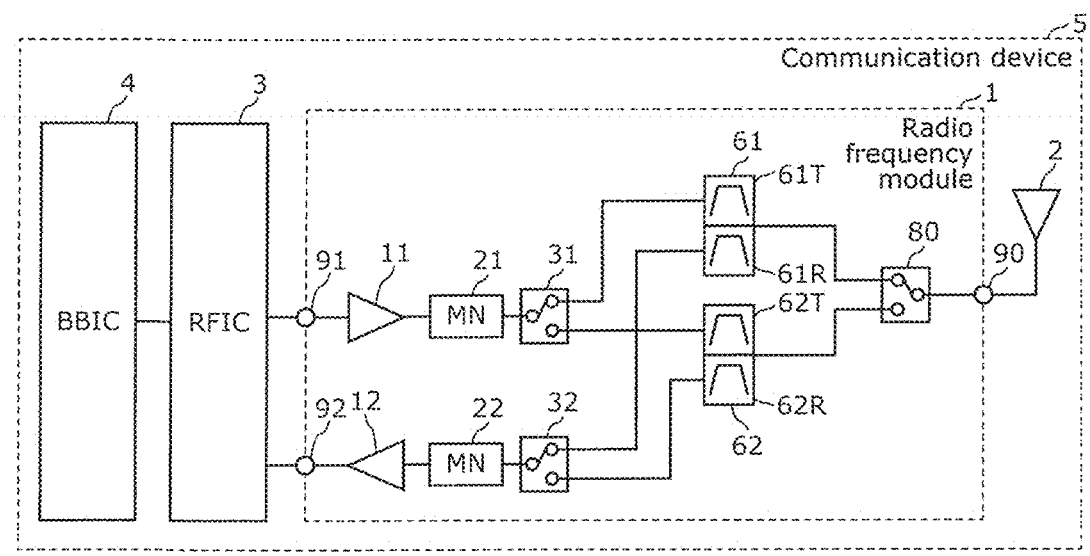
FIG. 1 is a circuit configuration diagram illustrating circuit configurations of a radio frequency module (or RF front-end circuitry) and a communication device according to Embodiment 1.

Hereinafter, exemplary embodiments and variations thereof according to the present disclosure will be described in detail with reference to the drawings. It should be noted that each of the subsequently described exemplary embodiments and variations thereof shows a generic or specific example. The numerical values, shapes, materials, elements, the arrangement and connection of the elements, and others indicated in the following exemplary embodiments and variations thereof are mere examples, and therefore are not intended to limit the present disclosure.

It should be noted that the drawings are schematic diagrams with emphasis, omission or ratio adjustment being made where necessary to illustrate the present disclosure. The drawings are thus not necessarily exact illustrations of the present disclosure, and may illustrate shapes, positional relationships, and ratios that are different from the actual ones. In the drawings, elements which are substantially the same are given the same reference signs, and their redundant descriptions are omitted or simplified.

In each of the drawings, the X axis and Y axis are perpendicular to each other on a plane that is parallel to the principal surfaces of the module board. The Z axis is perpendicular to the principal surfaces of the module board. The positive direction and the negative direction of the Z axis indicate an upward direction and a downward direction, respectively.

The meanings of the terms used to describe the present disclosure are as follows.

If it is said that an element "is connected" to another element, the expression includes not only a case where the element is directly connected to another element via a connector terminal and/or a wiring conductor, but also a case where the element is electrically connected to another element via other circuit element.

Terms indicating a relation between elements such as "parallel" and "perpendicular", terms indicating the shape of an element such as "quadrilateral", as well as numerical ranges express not only strict meanings, but also substantially identical ranges each including a deviation of about several percent, for example.

If it is said that an element "is disposed on a principal surface of a module board or a circuit component", the expression refers not only to a state in which the element is disposed in contact with the principal surface or the circuit component, but also to a state in which the element is disposed above the principal surface or the circuit component without contacting the principal surface or the circuit component.

The term "bonding" refers to a state in which an element is connected to another element so as to be in contact with each other. The term "bonding wire" refers to a conductive wire that makes an electrical connection between two elements so the two elements are in electrical contact with each other.

The term "a plan view" means a view of an element, from the Z direction, which is orthographically projected onto the XY plane.

If it is said that "A overlaps B in a plan view of a module board", the expression refers to a state in which the region of A projected in a plan view of a module board overlaps the region of B projected in the plan view of the module board.

If it is said that "C is disposed between A and B in a plan view of a module board", the expression means that in a plan view of a module board, a line segment connecting an arbitrary point in the region of A projected in the plan view of the module board and an arbitrary point in the region of B projected in the plan view of the module board passes through or contacts the region of C projected in the plan view of the module board.

Embodiment 1

Figure 2A:
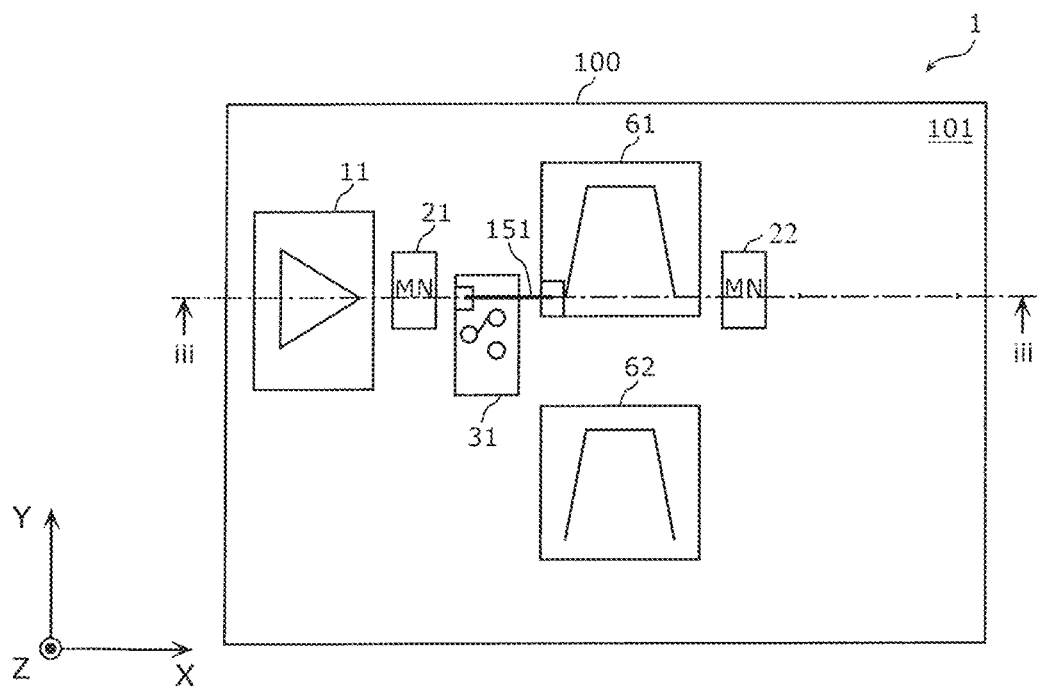
FIG. 2A is a plan view of the radio frequency module according to Embodiment 1.
Figure 2B:
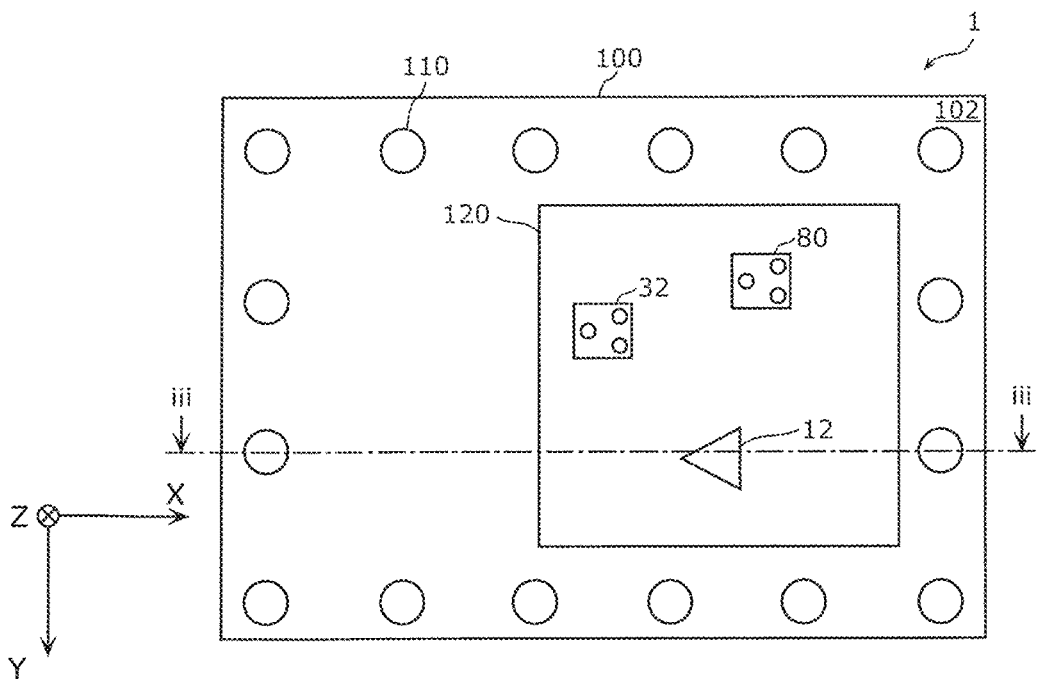
FIG. 2B is a bottom view of the radio frequency module according to Embodiment 1.
Figure 3:
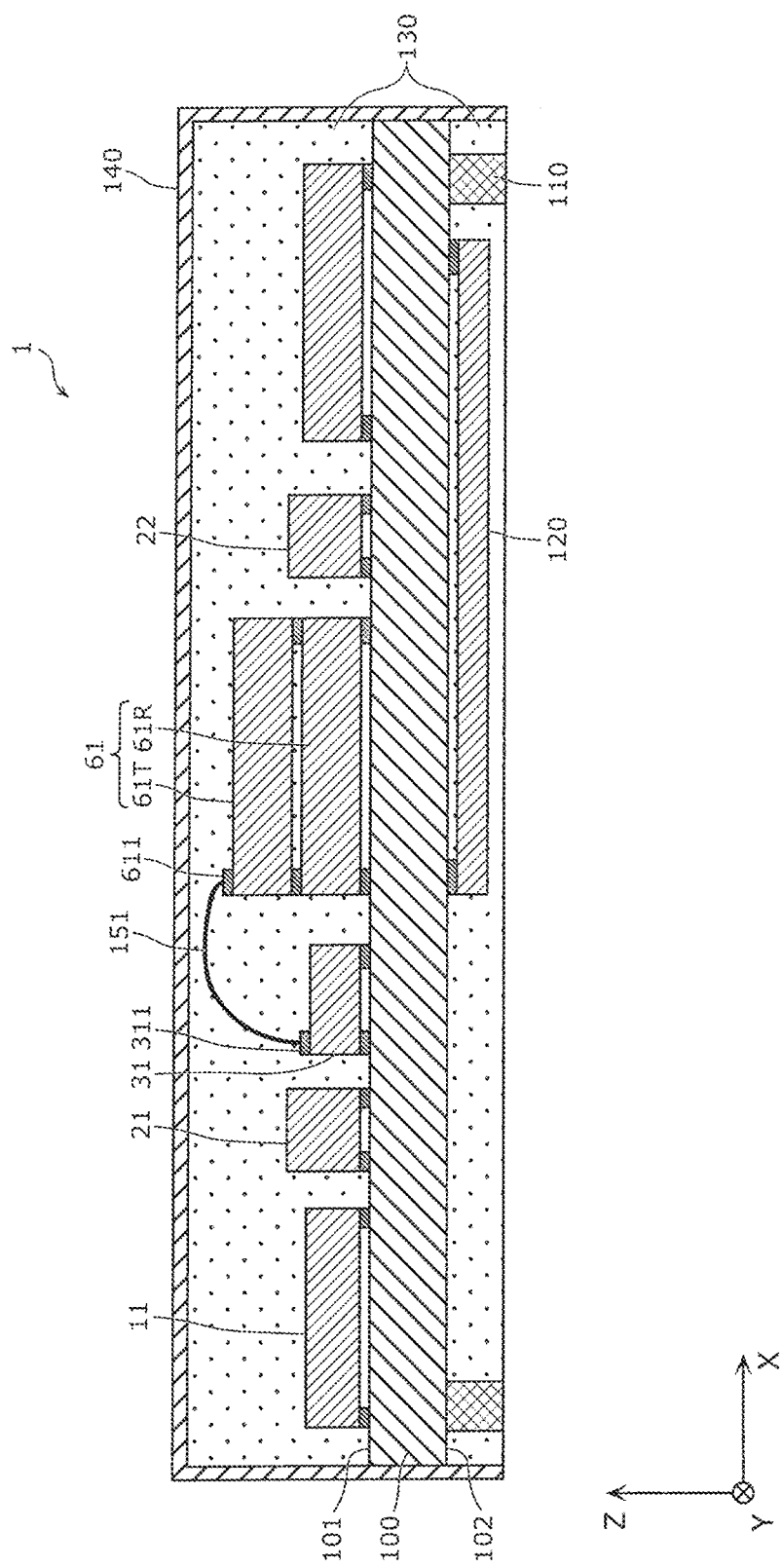
FIG. 3 is a cross-sectional view of the radio frequency module according to Embodiment 1.

The following describes Embodiment 1 with reference to FIG. 1 through FIG. 3.

[1. Circuit Configurations of Radio Frequency Module 1 and Communication Device 5]

The following describes circuit configurations of radio frequency module 1 and communication device 5. FIG. 1 is a circuit configuration diagram illustrating the circuit configurations of radio frequency module 1 and communication device 5 according to Embodiment 1. In this exemplary configuration the communication device 5 is a multi-band transceiver. As used in this specification the term "module", as used with "radio frequency module", or "RF front-end module" should be construed as circuitry (programmable, as well as discrete) and associated circuit components, such as circuit boards, RF shielding, etc.

[1.1 Circuit Configuration of Communication Device 5]

First, a circuit configuration of communication device 5 will be described in detail with reference to FIG. 1. As illustrated in FIG. 1, communication device 5 includes radio frequency module 1, antenna 2, RFIC 3, and BBIC 4.

Radio frequency module 1 transfers radio frequency signals between antenna 2 and RFIC 3. The detailed circuit configuration of radio frequency module 1 will be described later.

Antenna 2 is connected to antenna connector terminal 90 of radio frequency module 1, radiates a radio frequency signal that is output from radio frequency module 1, receives a radio frequency signal from outside, and outputs the received radio frequency signal to radio frequency module 1.

RFIC 3 is one example of a signal processing circuit that processes radio frequency signals transmitted or received by antenna 2. Specifically, RFIC 3 performs, by down-conversion, etc., signal processing on a radio frequency reception signal that is input via a reception signal path of radio frequency module 1, and outputs a reception signal generated through the signal processing to BBIC 4. RFIC 3 also performs, by up-conversion, etc., signal processing on a transmission signal that is input from BBIC 4, and outputs a radio frequency transmission signal generated through the signal processing to a transmission signal path of radio frequency module 1. In the following, a "transmission path" or "transmission signal path" means a transfer route that includes, for instance, a line through which a radio frequency transmission signal propagates, an electrode directly connected to the line, and a terminal directly connected to the line or the electrode. Further, a "reception path" means a transfer route that includes, for instance, a line through which a radio frequency reception signal propagates, an electrode directly connected to the line, and a terminal directly connected to the line or the electrode. In addition, a "transmission and reception path" means a transfer route that includes, for instance, a line through which a radio frequency transmission signal and a radio frequency reception signal propagate, an electrode directly connected to the line, and a terminal directly connected to the line or the electrode. Furthermore, as used herein the terms "circuit" or "circuitry" means one or more circuits, including discrete circuit(s) as well as circuit board(s) and combinations thereof.

BBIC 4 is a baseband signal processing circuit that performs signal processing using an intermediate frequency band including a frequency lower than a radio frequency signal propagating in radio frequency module 1. The signal processed by BBIC 4 is, for example, used as an image signal for image display or as a sound signal for conversation via a speaker.

RFIC 3 controls connections of switches 31, 32, and 80 included in radio frequency module 1, based on a communication band used. Moreover, RFIC 3 conveys, to radio frequency module 1, a control signal for adjusting a gain of power amplifier 11 in radio frequency module 1, for instance.

Note that communication device 5 according to this embodiment does not need to include antenna 2 and BBIC 4. In other words, antenna 2 and BBIC 4 are not essential elements of the communication device according to the present disclosure.

[1.2 Circuit Configuration of Radio Frequency Module 1]

Next, a circuit configuration of radio frequency module 1 will be described in detail with reference to FIG. 1. As illustrated in FIG. 1, radio frequency module 1 includes power amplifier 11, low-noise amplifier 12, matching circuits 21 and 22, switches 31, 32, and 80, duplexers 61 and 62, antenna connector terminal 90, transmission input terminal 91, and reception output terminal 92.

Power amplifier 11 amplifies radio frequency signals that are input from transmission input terminal 91. Specifically, power amplifier 11 amplifies radio frequency transmission signals, for example, of communication band A (a first communication band) and communication band B (a second communication band).

Low-noise amplifier 12 amplifies radio frequency reception signals to output the amplified radio frequency reception signals to reception output terminal 92. Specifically, low-noise amplifier 12 amplifies the radio frequency reception signals of communication bands A and B with low noise.

Duplexer 61 passes the radio frequency signals of communication band A. Duplexer 61 transfers transmission signals and reception signals of communication band A using a frequency division duplex (FDD) scheme. Duplexer 61 includes transmission filter 61T and reception filter 61R.

Transmission filter 61T is connected between power amplifier 11 and antenna connector terminal 90. Among the transmission signals amplified by power amplifier 11, transmission filter 61T passes transmission signals whose frequencies are included in the transmission band of communication band A.

Reception filter 61R is connected between low-noise amplifier 12 and antenna connector terminal 90. Among the reception signals that are input from antenna connector terminal 90, reception filter 61R passes reception signals whose frequencies are included in the reception band of communication band A.

Duplexer 62 passes the radio frequency signals of communication band B. Duplexer 62 transfers transmission signals and reception signals of communication band B using the FDD scheme. Duplexer 62 includes transmission filter 62T and reception filter 62R.

Transmission filter 62T is connected between power amplifier 11 and antenna connector terminal 90. Among the transmission signals amplified by power amplifier 11, transmission filter 62T passes transmission signals whose frequencies are included in the transmission band of communication band B.

Reception filter 62R is connected between low-noise amplifier 12 and antenna connector terminal 90. Among the reception signals that are input from antenna connector terminal 90, reception filter 62R passes reception signals whose frequencies are included in the reception band of communication band B.

Matching circuit 21 is connected between power amplifier 11 and transmission filters 61T and 62T, and is connected to the output terminal of power amplifier 11. Matching circuit 21 matches the impedance of power amplifier 11 with the impedance of transmission filters 61T and 62T.

Matching circuit 22 is connected between low-noise amplifier 12 and reception filters 61R and 62R, and is connected to the input terminal of low-noise amplifier 12. Matching circuit 22 matches the impedance of low-noise amplifier 12 with the impedance of transmission filters 61R and 62R.

Switch 31 includes a common terminal and two selector terminals. The common terminal of switch 31 is connected to power amplifier 11 via matching circuit 21. One of the selector terminals of switch 31 is connected to transmission filter 61T and the other of the selector terminals is connected to transmission filter 62T. In this connection configuration, switch 31 switches the connection of the common terminal between one and the other of the selector terminals. In other words, switch 31 is a band-selector switch that switches the connection of power amplifier 11 between transmission filter 61T and transmission filter 62T. Switch 31 includes, for example, a single pole double throw (SPDT) switch circuit.

Switch 32 includes a common terminal and two selector terminals. The common terminal of switch 32 is connected to low-noise amplifier 12 via matching circuit 22. One of the selector terminals of switch 32 is connected to reception filter 61R and the other of the selector terminals is connected to reception filter 62R. In this connection configuration, switch 32 switches the connection of the common terminal between one and the other of the selector terminals. In other words, switch 32 is an in-switch that switches the connection of low-noise amplifier 12 between reception filter 61R and reception filter 62R. Switch 32 includes, for example, a single pole double throw (SPDT) switch circuit.

Switch 80 includes a common terminal and two selector terminals. The common terminal of switch 80 is connected to antenna connector terminal 90. One of the selector terminals of switch 80 is connected to duplexer 61 and the other of the selector terminals is connected to duplexer 62. In this connection configuration, switch 80 switches between connecting and disconnecting the common terminal and one of the selector terminals, and also switches between connecting and disconnecting the common terminal and the other of the selector terminals. In other words, switch 80 is an antenna switch that switches between connecting and disconnecting antenna 2 and duplexer 61, and also switches between connecting and disconnecting antenna 2 and duplexer 62. Switch 80 includes, for example, a multiple-connection switch circuit.

Note that some of the circuit elements illustrated in FIG. 1 need not be included in radio frequency module 1. Radio frequency module 1 needs to include, for example, at least duplexer 61, and matching circuit 21 or switch 31.

[2. Arrangement of Circuit Components in Radio Frequency Module 1]

Next, the arrangement of circuit components in radio frequency module 1 configured as described above will be described in detail with reference to FIG. 2A, FIG. 2B, and FIG. 3.

FIG. 2A is a plan view of radio frequency module 1 according to Embodiment 1. FIG. 2B is a bottom view of radio frequency module 1 according to Embodiment 1. FIG. 3 is a cross-sectional view of radio frequency module 1 according to Embodiment 1. The cross-section of radio frequency module 1 in FIG. 3 is a cross-section taken along the line iii-iii in FIG. 2A or FIG. 2B.

As illustrated in FIG. 2A, FIG. 2B, and FIG. 3, radio frequency module 1 further includes module board 100, post electrodes 110, resin member 130, sealed electrode layer 140, bonding wire 151, and other circuit components (without reference signs) in addition to the circuit components mounted on the circuit element illustrated in FIG. 1. Note that in FIG. 2A and FIG. 2B, the illustrations of resin member 130 and sealed electrode layer 140 are omitted.

Module board 100 includes first principal surface 101 and second principal surface 102 opposite to first principal surface 101. For example, a printed circuit board (PCB), a low temperature co-fired ceramics (LTCC) board, or a resin multilayer board may be used for module board 100, but module board 100 is not limited to such.

First principal surface 101 is also referred to as a top surface or a surface. Power amplifier 11, matching circuits 21 and 22, switch 31, and duplexers 61 and 62 are mounted on first principal surface 101, as illustrated in FIG. 2A.

Second principal surface 102 is also referred to as a bottom surface or a rear surface. Low-noise amplifier 12 and switches 32 and 80 are mounted on second principal surface 102, as illustrated in FIG. 2B.

Matching circuits 21 and 22 each includes at least one inductor. Matching circuits 21 and 22 are each mounted on first principal surface 101 as, for example, a surface mounted device (SMD) and/or an integrated passive device (IPD). The inductor of matching circuit 21 is one example of a first inductor, and the inductor of matching circuit 22 is one example of a second inductor. Note that matching circuits 21 and 22 may each include at least one capacitor in addition to at least one inductor.

In the plan view of module board 100, matching circuits 21 and 22 are disposed between reception filter 61R and transmission filter 61T. In other words, in the plan view, reception filter 61R and transmission filter 61T are disposed between (the inductor of) matching circuit 21 and (the inductor of) matching circuit 22.

Switch 31 is one example of a circuit component mounted on the board and is disposed on first principal surface 101. Switch 31 is located close to duplexer 61 and is electrically connected to transmission filter 61T via bonding wire 151.

Reception filter 61R and transmission filter 61T included in duplexer 61 are stacked on first principal surface 101. In this embodiment, reception filter 61R is one example of a first filter disposed on first principal surface 101 of the board. Transmission filter 61T is one example of a second filter disposed on the first filter.

Reception filter 62R and transmission filter 62T included in duplexer 62 are also stacked on first principal surface 101. Note that reception filter 62R and transmission filter 62T need not necessarily be stacked.

Transmission filters 61T and 62T as well as reception filters 61R and 62R may each be, but not limited to, any one of an acoustic wave filter that uses surface acoustic waves (SAWs), an acoustic wave filter that uses bulk acoustic waves (BAWs), an LC resonance filter, and a dielectric filter, or any selected combination thereof.

Low-noise amplifier 12 and switches 32 and 80 are embedded in semiconductor integrated circuit (IC) 120 disposed on second principal surface 102. In the plan view of module board 100, at least part of semiconductor IC 120 overlaps at least part of reception filter 61R. Moreover, semiconductor IC 120 does not overlap power amplifier 11 in the plan view of module board 100.

Semiconductor IC 120 includes, for example, a complementary metal oxide semiconductor (CMOS). This enables manufacturing of semiconductor ICs 120 with low cost. Note that semiconductor IC 120 may comprise GaAs or SiGe. This enables output of radio frequency signals having high-quality amplification performance and noise performance.

Post electrodes 110 are each one example of an external-connection terminal. Each of post electrodes 110 is disposed on second principal surface 102 of module board 100 and extends from second principal surface 102. Each of post electrodes 110 penetrates resin member 130 and one end of post electrode 110 is exposed from resin member 130. One end of each of post electrodes 110 exposed from resin member 130 is connected to, for instance, an input/output terminal and/or a grand electrode disposed on a motherboard on the side of the Z-axis negative direction of radio frequency module 1.

Resin member 130 is disposed on first principal surface 101 and second principal surface 102 of module board 100, and covers the circuit components on first principal surface 101 and second principal surface 102. Resin member 130 has a function to ensure reliability on mechanical strength and moisture resistance of the circuit components on first principal surface 101 and second principal surface 102.

Sealed electrode layer 140 is formed to cover the top and lateral surfaces of resin member 130 and the potential thereof is set to a ground potential. Sealed electrode layer 140 has a function to inhibit external noise from entering the circuit components included in radio frequency module 1.

Bonding wire 151 connects transmission filter 61T to switch 31. In this embodiment, one end of bonding wire 151 is connected to electrode 611 on the top surface of transmission filter 61T and the other end of bonding wire 151 is connected to electrode 311 on the top surface of switch 31. In the plan view of module board 100, bonding wire 151 is connected to switch 31 in a location distant from reception filter 61R. As a result, it is possible for bonding wire 151 to connect transmission filter 61T and switch 31 without passing through 61R or directly below reception filter 61R. In this embodiment, the bonding wire 151 has an arc-shape that arches away from the reception filter so as to maintain a greater distance from the reception filter 61R than if the bonding wire 151 was straight.

Note that radio frequency module 1 does not need to include resin member 130 and sealed electrode layer 140. In other words, resin member 130 and sealed electrode layer 140 are not essential elements of the radio frequency module according to the present disclosure. Moreover, the location of electrode 611 on the top surface of transmission filter 61T, the location of electrode 311 on the top surface of switch 31, and a path along which bonding wire 151 passes are examples and are not limited to the above examples.

[3. Advantageous Effects etc.]

As described above, radio frequency module 1 according to this embodiment includes: module board 100 including first principal surface 101; a first filter (reception filter 61R) disposed on or above first principal surface 101; a second filter (transmission filter 61T) disposed on the first filter; a circuit component (switch 31) mounted on module board 100; and bonding wire 151 that connects the second filter to the circuit component. One of the first filter and the second filter is transmission filter 61T, and the other of the first filter and the second filter is reception filter 61R. One end of bonding wire 151 is connected to the second filter, and the other end of bonding wire 151 is connected to the circuit component or an electrode on first principal surface 101, the electrode being connected to the circuit component.

Moreover, communication device 5 according to this embodiment includes: RFIC 3 that processes a radio frequency signal transmitted or received by antenna 2; and radio frequency module 1 that transfers the radio frequency signal between antenna 2 and RFIC 3.

According to this configuration, it is possible to transfer radio frequency signals from the second filter to the circuit component or from the circuit component to the second filter via bonding wire 151 without passing through or directly below the first filter. Accordingly, it is possible to inhibit unnecessary interference between a radio frequency transmission signal and a radio frequency reception signal and thus enhance isolation characteristics between a transmission circuit and a reception circuit. Furthermore, since there is no need to form, in the first filter, an input/output terminal for the second filter, it is possible to enhance flexibility in the arrangement of the input/output terminal of the first filter and thus enhance wiring flexibility in module board 100 below the first filter.

For example, in radio frequency module 1 according to this embodiment, module board 100 may further include second principal surface 102 opposite to first principal surface 101. Radio frequency module 1 may further include low-noise amplifier 12 that is disposed on second principal surface 102 and amplifies a radio frequency reception signal. The first filter may be reception filter 61R, and the second filter may be transmission filter 61T.

According to this configuration, it is possible to mount circuit elements on both surfaces of module board 100 and thus achieve miniaturization of radio frequency module 1. Moreover, since reception filter 61R is disposed below transmission filter 61T and low-noise amplifier 12 is disposed on second principal surface 102 of module board 100, it is possible to separate a transmission path and a reception path, one above and the other below. Accordingly, it is possible to enhance isolation characteristics between a transmission circuit and a reception circuit.

For example, in radio frequency module 1 according to this embodiment, in a plan view of board 100, at least part of reception filter 61R may overlap at least part of low-noise amplifier 12.

According to this configuration, it is possible to dispose reception filter 61R and low-noise amplifier 12 to be closer to each other and thus shorten the length of wirings in a reception circuit. As a result, it is possible to reduce wiring loss and matching errors due to wirings and thus enhance reception sensitivity.

For example, radio frequency module 1 according to this embodiment may further include power amplifier 11 that is disposed on first principal surface 101 and amplifies a radio frequency transmission signal. The circuit component may be switch 31 connected between power amplifier 11 and transmission filter 61T.

According to this configuration, it is possible to connect transmission filter 61T and switch 31 via bonding wire 151 when switch 31 is connected between transmission filter 61T and power amplifier 11.

For example, in radio frequency module 1 according to this embodiment, switch 31 may be disposed on first principal surface 101, and the other end of bonding wire 151 is connected to the top surface of switch 31.

According to this configuration, it is possible to bond bonding wire 151 to the top surface of switch 31 and shorten the length of bonding wire 151 more than the case of bonding the bonding wire 151 to an electrode on module board 100. Moreover, since an electrode for bonding the bonding wire 151 is not required on module board 100, it is possible to enhance flexibility in the arrangement of the circuit components on module board 100.

For example, radio frequency module 1 according to this embodiment may further include: a first inductor (the inductor of matching circuit 21) that is disposed on first principal surface 101, is connected between transmission filter 61T and power amplifier 11 that amplifies a radio frequency transmission signal; and a second inductor (the inductor of matching circuit 22) that is disposed on first principal surface 101, connected between reception filter 61R and low-noise amplifier 12 that amplifies a radio frequency reception signal. In a plan view of module board 100, the first filter and the second filter may be disposed between the first inductor and the second inductor.

According to this configuration, since a tall stacked component (the first filter and the second filter) is disposed between the first inductor and the second inductor, electromagnetic coupling between the first inductor and the second inductor is inhibited. Accordingly, it is possible to inhibit the following from entering a reception circuit through the electromagnetic coupling: a high-output radio frequency transmission signal amplified by power amplifier 11; its harmonic component; and an intermodulation distortion component between the radio frequency transmission signal and another radio frequency signal. As a result, it is possible to enhance isolation characteristics between a transmission circuit and a reception circuit and thus reduce the deterioration of reception sensitivity of the reception circuit.

For example, in radio frequency module 1 according to this embodiment, the first filter and the second filter may constitute duplexer 61.

According to this configuration, it is possible to shorten the length of wirings between a transmission filter and a reception filter included in a duplexer and thus reduce wiring loss and matching errors due to wirings.

Variation of Embodiment 1

Next, a variation of Embodiment 1 will be described. In this variation, the number of stacked filters is three, which is a main difference from the above-described Embodiment 1. A radio frequency module according to this variation will be described in detail with reference to FIG. 4 through FIG. 6, focusing on the difference from the above-described Embodiment 1.

Figure 4:
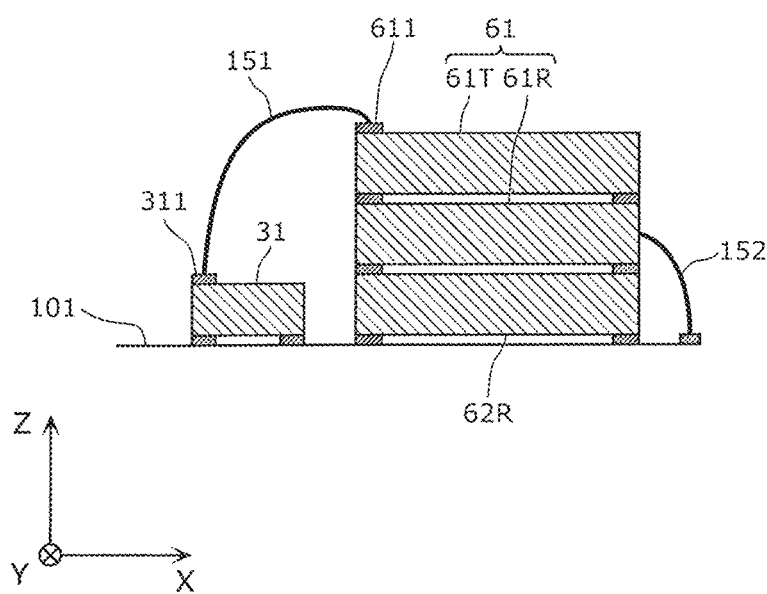
FIG. 4 is a cross-sectional view illustrating the periphery of stacked filters according to a variation of Embodiment 1.

In FIG. 4, reception filter 62R, reception filter 61R, and transmission filter 61T are stacked in this order from bottom to top. Also, in this case, reception filter 61R corresponds to the first filter disposed above first principal surface 101 of the board, and transmission filter 61T corresponds to the second filter disposed on the first filter.

In FIG. 4, transmission filter 61T disposed on the top is connected to switch 31 via bonding wire 151, as is the case described in Embodiment 1. Reception filter 61R disposed in the middle is connected to an electrode on first principal surface 101 via bonding wire 152. Specifically, one end of bonding wire 152 is connected to reception filter 61R and the other end of bonding wire 152 is connected to the electrode on first principal surface 101.

Figure 5:
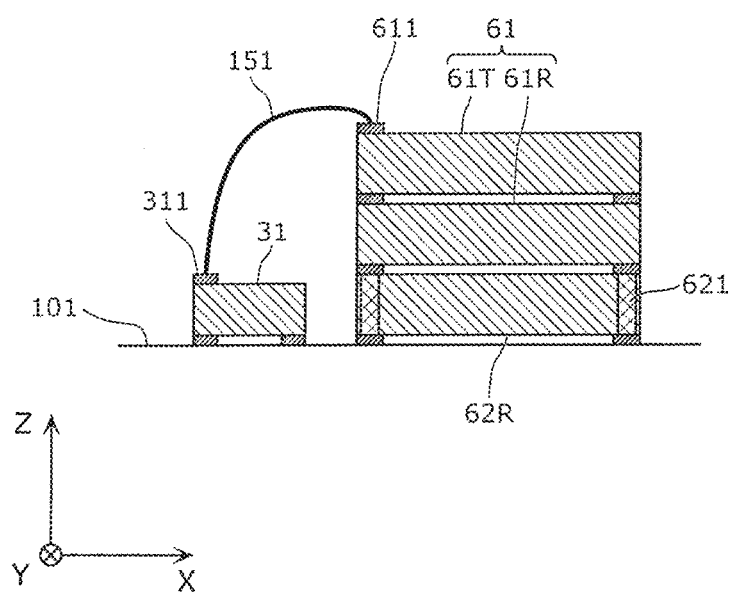
FIG. 5 is a cross-sectional view illustrating the periphery of the stacked filters according to the variation of Embodiment 1.

In FIG. 5, reception filter 62R, reception filter 61R, and transmission filter 61T are stacked in this order from bottom to top, as illustrated in FIG. 4. In this case also, reception filter 61R corresponds to the first filter disposed above first principal surface 101 of the board, and transmission filter 61T corresponds to the second filter disposed on the first filter.

In FIG. 5, transmission filter 61T disposed on the top is connected to switch 31 via bonding wire 151, as is the case described in Embodiment 1. Reception filter 61R disposed in the middle is connected to an electrode on first principal surface 101 via, instead of bonding wire 152, via electrode 621 formed in reception filter 62R.

Figure 6:
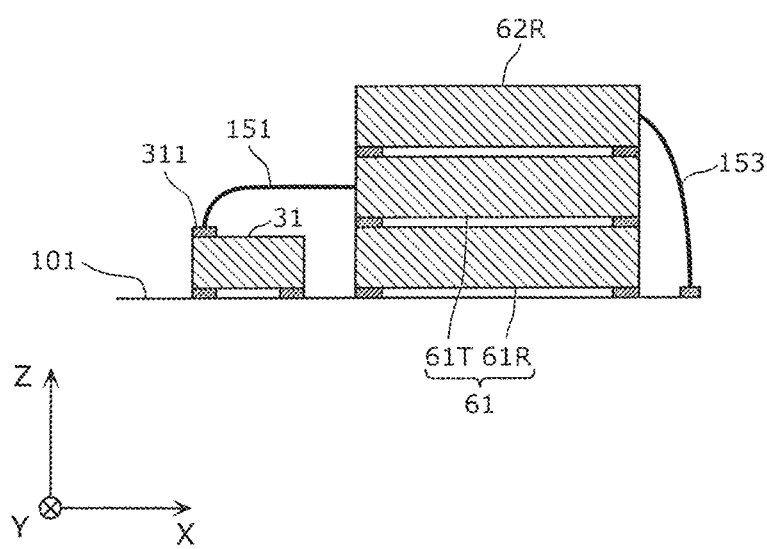
FIG. 6 is a cross-sectional view illustrating the periphery of the stacked filters according to the variation of Embodiment 1.

In FIG. 6, reception filter 62R, transmission filter 61T, and reception filter 62R are stacked in this order from bottom to top. In this case also, reception filter 61R corresponds to the first filter disposed on first principal surface 101 of the board, and transmission filter 61T corresponds to the second filter disposed on the first filter.

In FIG. 6, transmission filter 61T disposed in the middle is connected to switch 31 via bonding wire 151. Reception filter 62R disposed on the top is connected to an electrode on first principal surface 101 via bonding wire 153.

As described above, it is possible to connect switch 31 to transmission filter 61T disposed on reception filter 61R via bonding wire 151 even when three filters are stacked. Accordingly, it is possible to enhance isolation characteristics between a transmission circuit and a reception circuit, as is the case of Embodiment 1.

Although the number of stacked filters is three in this variation, the number is not limited to three. The number of stacked filters may be four or greater.

Embodiment 2

Next, Embodiment 2 will be described. In this embodiment, switch 31 to be connected to transmission filter 61T is mounted on second principal surface 102 of module board 100, which is a main difference from the above-described Embodiment 1. The following describes a radio frequency module according to this embodiment in detail with reference to FIG. 7, mainly focusing on the difference from the above-described Embodiment 1.

Figure 7:
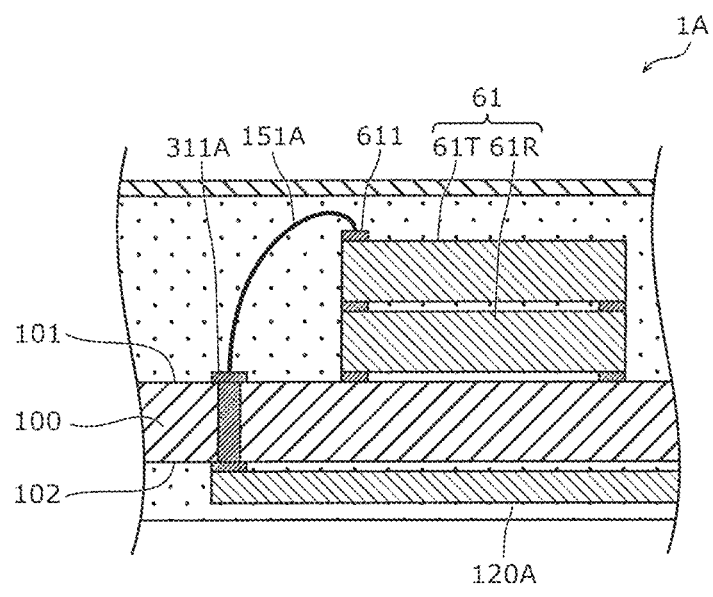
FIG. 7 is a partial sectional view of a radio frequency module according to Embodiment 2.

FIG. 7 is a cross-sectional view of radio frequency module 1A according to Embodiment 2. In addition to low-noise amplifier 12 and switches 32 and 80, radio frequency module 1A according to this embodiment includes semiconductor IC 120A including switch 31.

Transmission filter 61T is connected to semiconductor IC 120A disposed on second principal surface 102 not only via bonding wire 151A, but also via the via electrode 311A formed in module board 100. Specifically, one end of bonding wire 151A is connected to electrode 611 on the top surface of transmission filter 61T, as is the case in Embodiment 1, while the other end of bonding wire 151A is connected, on first principal surface 101, to via electrode 311A connected to switch 31.

In FIG. 7, via electrode 311A is a through via electrode, but is not limited to such. Via electrode 311A may be implemented by a combination of a non-penetrating via electrode formed on first principal surface 101, a non-penetrating via electrode formed on second principal surface 102, and a wiring pattern for connecting the two non-penetrating via electrodes in module board 100.

As described above, in radio frequency module 1A according to this embodiment, switch 31 is disposed on second principal surface 102 and the other end of bonding wire 151A is connected, on first principal surface 101, to via electrode 311A that is formed in module board 100 and connected to switch 31.

According to this configuration, it is possible to connect transmission filter 61T to switch 31 via bonding wire 151A and via electrode 311A without passing through reception filter 61R, even when switch 31 is disposed on second principal surface 102 of module board 100. This can enhance isolation characteristics between a transmission circuit and a reception circuit.

Embodiment 3

Next, Embodiment 3 will be described. In this embodiment, switch 31 is not provided and transmission filter 61T is connected to matching circuit 21 via bonding wire 151B, which is a main difference from the above-described Embodiment 1. The radio frequency module according to this embodiment will be described in detail with reference to FIG. 8, mainly focusing on the difference from the above-described Embodiment 1.

Figure 8:
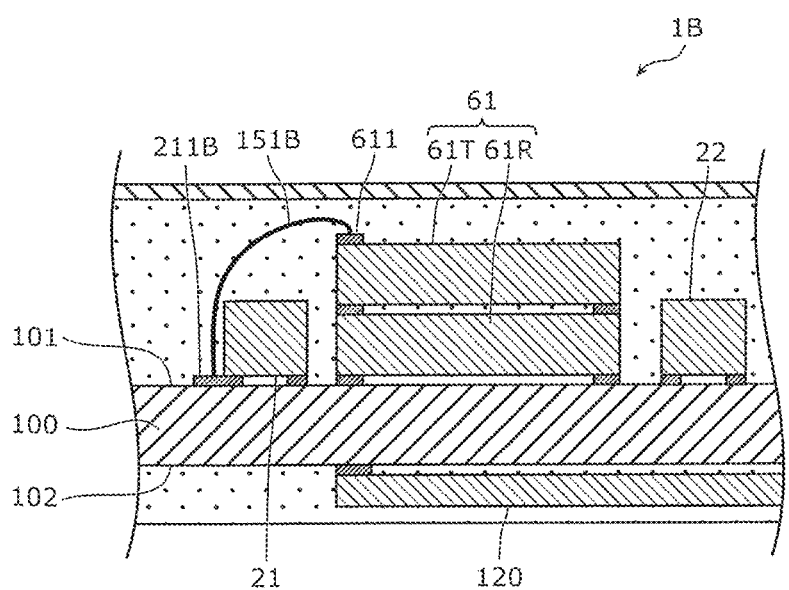
FIG. 8 is a partial sectional view of a radio frequency module according to Embodiment 3.

FIG. 8 is a cross-sectional view of radio frequency module 1B according to Embodiment 3. In radio frequency module 1B according to this embodiment, bonding wire 151B connects transmission filter 61T to an inductor (a first inductor) of matching circuit 21. In other words, the inductor of matching circuit 21 corresponds to a circuit component mounted on a board.

Specifically, one end of bonding wire 151B is connected to electrode 611 on the top surface of transmission filter 61T, as is the case described in Embodiment 1. On the other hand, the other end of bonding wire 151B is connected, on first principal surface 101, to land electrode 211B of the inductor of matching circuit 21.

Land electrode 211B is disposed opposite to reception filter 61R with the main body of matching circuit 21 interposed therebetween. In other words, the main body of matching circuit 21 is disposed between land electrode 211B and reception filter 61R. In other words, bonding wire 151B is connected to land electrode 211B at a location distant from reception filter 61R in the plan view of module board 100.

As described above, radio frequency module 1B according to this embodiment is disposed on first principal surface 101 and includes power amplifier 11 that amplifies radio frequency signals. A circuit component to be connected to transmission filter 61T via bonding wire 151B is disposed on first principal surface 101 and is an inductor of matching circuit 21 connected between power amplifier 11 and transmission filter 61T.

According to this configuration, it is possible to connect transmission filter 61T to the inductor of matching circuit 21 via bonding wire 151B when matching circuit 21 is connected between transmission filter 61T and power amplifier 11.

Other Embodiments

Although the radio frequency module and the communication device according to the present disclosure have been described above based on exemplary embodiments and variations thereof, the radio frequency module and the communication device according to the present disclosure are not limited to the foregoing embodiments and variations thereof. The present disclosure also encompasses other embodiments achieved by combining arbitrary elements in the above embodiments and variations thereof, variations resulting from various modifications to the embodiments and variations thereof that may be conceived by those skilled in the art without departing from the essence of the present disclosure, and various devices that include the radio frequency module and the communication device according to the embodiments and variations thereof.

For example, in the radio frequency module and the communication device according to each of the foregoing embodiments and variations thereof, another circuit element or wire may be inserted between a circuit element and a signal path or between signal paths, or in a path connecting a circuit element and a signal path, in a path connecting circuit elements, or in a path connecting signal paths in each of the circuit configuration diagrams disclosed. A matching circuit may be connected, for example, between duplexer 61 and switch 80 and/or between duplexer 62 and switch 80.

Figure 9:
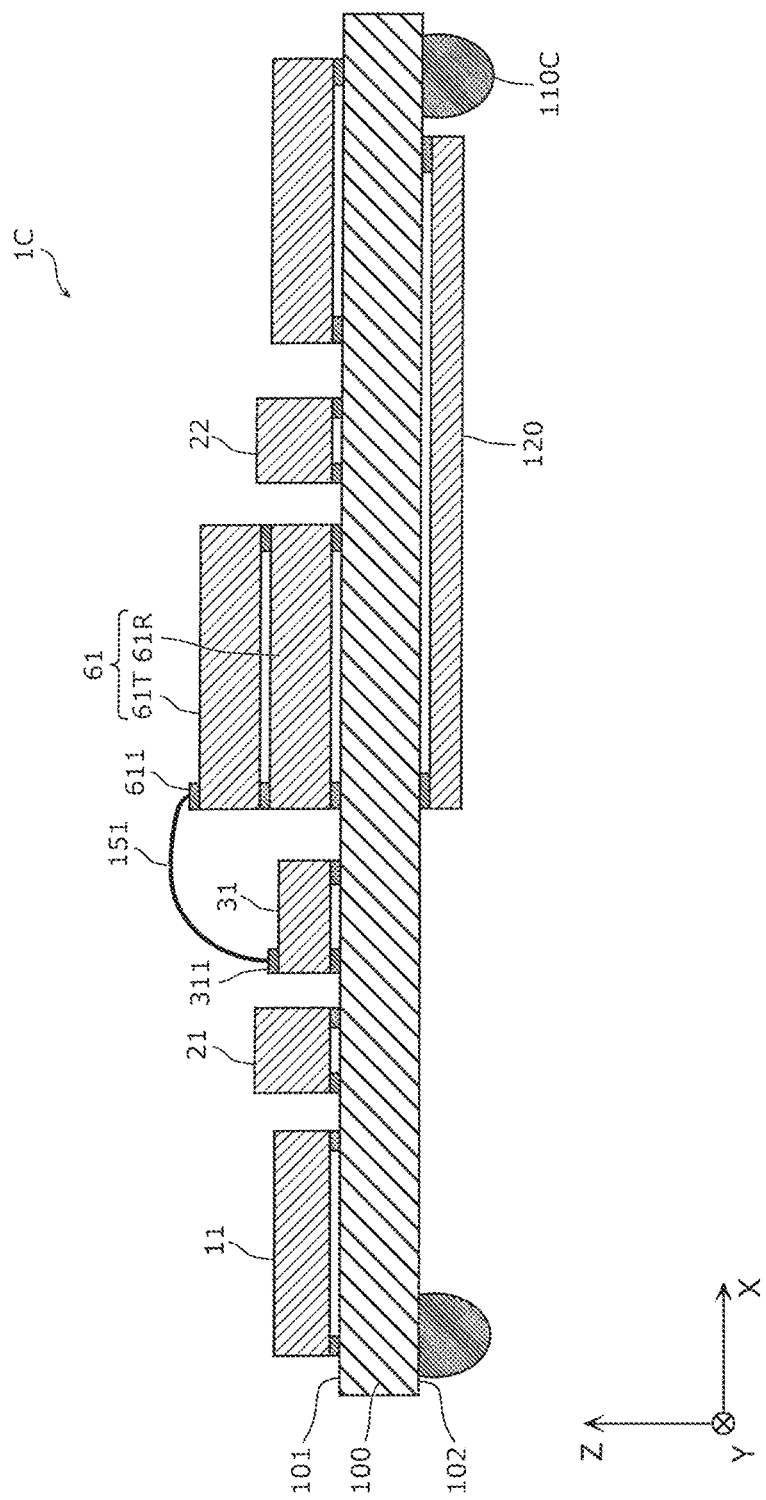
FIG. 9 is a cross-sectional view of a radio frequency module according to other variation.

Although the radio frequency module according to each of the aforementioned embodiments and variations thereof includes post electrode 110 as an external-connection terminal, the external-connection terminal is not limited to such. A radio frequency module IC may include, instead of post electrode 110, bump electrode 110C as an external-connection terminal, as illustrated in FIG. 9. In this case, the radio frequency module IC does not need to include resin member 130 and sealed electrode layer 140.

It should be noted that a location for bonding the other end of a bonding wire is not limited to the bonding location according to each of the aforementioned embodiments and variations thereof. The other end of the bonding wire may be connected to an electrode on first principal surface 101, which is connected to switch 31 or matching circuit 21 via a planar wiring pattern on first principal surface 101. This can enhance flexibility in deciding the bonding location of the bonding wire.

Although the circuit components according to each of the embodiments and variations thereof are disposed both on first principal surface 101 and second principal surface 102 of module board 100, the locations of the circuit components are not limited to such. The circuit components may be disposed, for example, exclusively on either first principal surface 101 or second principal surface 102 of module board 100.

Although transmission filter 61T is disposed on reception filter 61R in each of the embodiments and variations thereof, the arrangement of these filters is not limited to such. For example, reception filter 61R may be disposed on transmission filter 61T. In this case, power amplifier 11 may be mounted on second principal surface 102 of module board 100 and low-noise amplifier 12 may be mounted on first principal surface 101 of module board 100.

Although a reception filter and a transmission filter which are stacked one on the top of the other constitute a duplexer in each of the aforementioned embodiments and variations thereof, the configuration of the filters is not limited to such. For example, a reception filter and a transmission filter for different communication bands may be stacked one on top of the other.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure can be widely used in communication apparatuses such as mobile phones, as a radio frequency module disposed in a front-end section.

The invention claimed is:

1. A radio frequency module, comprising:
a module board including a first principal surface;
a first filter disposed on or above the first principal surface;
a second filter, the first filter and the second filter are in a stacked arrangement with one another;
a circuit component mounted on the module board; and
a bonding wire that connects the second filter to the circuit component, wherein
one of the first filter and the second filter is a transmission filter,
the other of the first filter and the second filter is a reception filter,
one end of the bonding wire is connected to the second filter, and
the other end of the bonding wire is connected to the circuit component or an electrode on the first principal surface, the electrode being connected to the circuit component.

2. The radio frequency module according to claim 1 wherein
the module board further includes a second principal surface opposite to the first principal surface,
the radio frequency module further comprises a low-noise amplifier disposed on the second principal surface and configured to amplify a radio frequency reception signal,
the first filter is the reception filter, and
the second filter is the transmission filter.

3. The radio frequency module according to claim 2, wherein
in a plan view of the module board, at least part of the reception filter overlaps at least part of the low-noise amplifier.

4. The radio frequency module according to claim 2, further comprising:
a power amplifier disposed on the first principal surface and configured to amplify a radio frequency transmission signal, wherein
the circuit component is a switch connected between the power amplifier and the transmission filter.

5. The radio frequency module according to claim 4, wherein
the switch is disposed on the first principal surface, and
the other end of the bonding wire is connected to a top surface of the switch.

6. The radio frequency module according to claim 4, wherein
the switch is disposed on the second principal surface, and
the other end of the bonding wire is connected, on the first principal surface, to a via electrode formed in the module board and connected to the switch.

7. The radio frequency module according to claim 2, further comprising:
a power amplifier disposed on the first principal surface and configured to amplify a radio frequency transmission signal, wherein
the circuit component is a first inductor disposed on the first principal surface and connected between the power amplifier and the transmission filter.

8. The radio frequency module according to claim 2, wherein
the bonding wire has an arc-shape that arches away from the reception filter so as to maintain a greater distance from the reception filter than if the bonding wire was straight.

9. The radio frequency module according to claim 1, further comprising:
a first inductor disposed on the first principal surface and connected between the transmission filter and a power amplifier configured to amplify a radio frequency transmission signal; and
a second inductor disposed on the first principal surface and connected between the reception filter and a low-noise amplifier that is configured to amplify a radio frequency reception signal, wherein
in a plan view of the module board, the first finer and the second filter are disposed between the first inductor and the second inductor.

10. The radio frequency module according to claim 1, wherein
the first filter and the second filter constitute a duplexer.

11. A communication device, comprising:
a signal processing circuit configured to process a radio frequency signal transmitted or received by an antenna; and
a radio frequency module configured to transfer the radio frequency signal between the antenna and the signal processing circuit, the radio frequency module, including
a module board including a first principal surface,
a first filter disposed on or above the first principal surface, a second filter, the first filter and the second filter are in a stacked arrangement with one another, a circuit component mounted on the module board, and a bonding wire that connects the second filter to the circuit component, wherein one of the first filter and the second filter is a transmission filter, the other of the first filter and the second filter is a reception filter, one end of the bonding wire is connected to the second filter, and the other end of the bonding wire is connected to the circuit component or an electrode on the first principal surface, the electrode being connected to the circuit component.

12. The communication device according to claim 11, wherein the module board further includes a second principal surface opposite to the first principal surface, the radio frequency module further comprises a low-noise amplifier disposed on the second principal surface and configured to amplify a radio frequency reception signal, the first filter is the reception filter, and the second filter is the transmission filter.

13. The communication device according to claim 12, wherein in a plan view of the module board, at least part of the reception filter overlaps at least part of the low-noise amplifier.

14. The communication device according to claim 12, wherein the radio frequency module further including:

a power amplifier disposed on the first principal surface and configured to amplify a radio frequency transmission signal, wherein the circuit component is a switch connected between the power amplifier and the transmission filter.

15. The communication device according to claim 14, wherein the switch is disposed on the first principal surface, and the other end of the bonding wire is connected to a top surface of the switch.

16. The communication device according to claim 14, wherein the switch is disposed on the second principal surface, and the other end of the bonding wire is connected, on the first principal surface, to a via electrode formed in the module board and connected to the switch.

17. The communication device according to claim 12, wherein the radio frequency module further including:

a power amplifier disposed on the first principal surface and configured to amplify a radio frequency transmission signal, wherein the circuit component is a first inductor disposed on the first principal surface and connected between the power amplifier and the transmission filter.

18. The communication device according to claim 12, wherein the bonding wire has an arc-shape that arches away from the reception filter so as to maintain a greater distance from the reception filter than if the bonding wire was straight.

19. The communication device according to claim 11, wherein the radio frequency module further including:

a first inductor disposed on the first principal surface and connected between the transmission filter and a power amplifier configured to amplify a radio frequency transmission signal; and a second inductor disposed on the first principal surface and connected between the reception filter and a low-noise amplifier that is configured to amplify a radio frequency reception signal, wherein in a plan view of the module board, the first filter and the second filter are disposed between the first inductor and the second inductor.

20. The communication device according to claim 11, wherein the first filter and the second filter constitute a duplexer.

* * * * *